United States Patent
Sagfors et al.

(10) Patent No.: US 8,151,154 B2
(45) Date of Patent: Apr. 3, 2012

(54) METHOD AND A TRANSMITTER/RECEIVER FOR REDUCED SIGNALING IN A RETRANSMISSION SYSTEM USING HYBRID AUTOMATIC REPEAT

(75) Inventors: Mats Sagfors, Kyrkslatt (FI); Johan Torsner, Masaby (FI); Stefan Wager, Espoo (FI)

(73) Assignee: Telefonaktiebolaget L M Ericsson (publ) (SE)

( * ) Notice: Subject to any disclaimer, the term of this patent is extended or adjusted under 35 U.S.C. 154(b) by 897 days.

(21) Appl. No.: 12/097,490

(22) PCT Filed: Dec. 16, 2005

(86) PCT No.: PCT/SE2005/001938
§ 371 (c)(1),
(2), (4) Date: Jun. 13, 2008

(87) PCT Pub. No.: WO2007/069952
PCT Pub. Date: Jun. 21, 2007

(65) Prior Publication Data
US 2008/0301515 A1    Dec. 4, 2008

(51) Int. Cl.
*G06F 11/00*    (2006.01)

(52) U.S. Cl. ........................................ 714/748; 714/749

(58) Field of Classification Search ........................ None
See application file for complete search history.

(56) References Cited

U.S. PATENT DOCUMENTS

| 7,554,985 | B2 * | 6/2009 | Ihm et al. ........................ 370/394 |
| 7,574,645 | B2 * | 8/2009 | Pan et al. ........................ 714/748 |
| 2002/0080802 | A1 | 6/2002 | Sachs et al. |
| 2003/0100268 | A1 | 5/2003 | Moulsley et al. |
| 2003/0210668 | A1 | 11/2003 | Malladi et al. |
| 2005/0250497 | A1 | 11/2005 | Ghosh et al. |
| 2005/0251722 | A1 * | 11/2005 | Terry et al. ........................ 714/749 |
| 2005/0276249 | A1 | 12/2005 | Damnjanovic et al. |
| 2006/0282739 | A1 * | 12/2006 | Meyer et al. ........................ 714/748 |
| 2008/0301515 | A1 * | 12/2008 | Sagfors et al. ........................ 714/748 |

FOREIGN PATENT DOCUMENTS

| EP | 1 326 361 A1 | 7/2003 |
| WO | WO 2004/072673 A2 | 8/2004 |
| WO | WO 2005/018144 A1 | 2/2005 |

OTHER PUBLICATIONS

International Search Report and Written Opinion dated Sep. 1, 2006 (9 pages).
Communication with Supplementary European Search Report, EP Application No. EP05821938.7, Jan. 9, 2012.
Communication pursuant to Article 94(3) EPC, EP Application No. EP05821938.7, Jan. 23, 2012.

* cited by examiner

*Primary Examiner* — Michael Maskulinski
(74) *Attorney, Agent, or Firm* — Myers Bigel Sibley & Sajovec, PA

(57) ABSTRACT

The present invention relates to a transmitter and a receiver for a mobile communication system. The basic idea of the present invention is to target the number of HARQ transmissions that is required to be able to decode the transmitted data successfully and to only transmit HARQ feedback information if the decoding result differs from an expected result, wherein the expected result is based on the targeted number of required HARQ transmissions.

31 Claims, 4 Drawing Sheets

METHOD AND A TRANSMITTER/RECEIVER FOR REDUCED SIGNALING IN A RETRANSMISSION SYSTEM USING HYBRID AUTOMATIC REPEAT

FIELD OF THE INVENTION

The present invention relates to arrangements in a mobile communication network. In particular, the present invention relates to an improvement of Hybrid Automatic repeat request (HARQ).

BACKGROUND OF THE INVENTION

The present invention relates to methods and arrangements in a mobile communication network adapted to use re-transmissions of the type Hybrid Automatic repeat request (HARQ). An example of such a communication network is a UMTS terrestrial radio access network (UTRAN). The UTRAN is illustrated in FIG. 1 and comprises at least one Radio Network System 100 connected to the Core Network (CN) 200. The CN is connectable to other networks such as the Internet, other mobile networks e.g. GSM systems and fixed telephony networks. The RNS 100 comprises at least one Radio Network Controller 110. Furthermore, the respective RNC 110 controls a plurality of Node-Bs 120,130 that are connected to the RNC by means of the Iub interface 140. Each Node B covers one or more cells and is arranged to serve the User Equipment (UE) 300 within said cell. Finally, the UE 300, also referred to as mobile terminal, is connected to one or more Node Bs over the Wideband Code Division Multiple Access (WCDMA) based radio interface 150.

Requirements for mobile data access are increasing and demand for bandwidth is growing. To meet these needs the High Speed Data Packet Access (HSDPA) specification has been defined. HSDPA is based on WCDMA evolution standardized as part of 3GPP Release 5 WCDMA specifications. HSDPA is a packet-based data service in WCDMA downlink with data transmission peak rate up to 14.4 Mbps over a 5 MHz bandwidth. Thus HSDPA improves system capacity and increases user data rates in the downlink direction. The improved performance is based on adaptive modulation and coding, a fast scheduling function and fast retransmissions with soft combining and incremental redundancy. HSDPA utilizes a transport channel named the High Speed Downlink Shared Channel (HS-DSCH) that makes efficient use of valuable radio frequency resources and takes bursty packet data into account. This is a shared transport channel which means that resources, such as channelization codes, transmission power and infra structure hardware, is shared between several users. HS-DSCH supports HARQ as a fast and resource-efficient method for combating transmission errors.

In 3GPP Release 6, the WCDMA standard is further extended with the Enhanced Uplink concept by introducing the Enhanced Dedicated Transport Channel, E-DCH. A further description can be found in 3GPP TS 25.309 "FDD Enhanced Uplink; Overall description". This concept introduces considerably higher peak data-rates in the WCDMA uplink. Features introduced with E-DCH include fast scheduling and fast Hybrid Automatic Repeat reQuest (HARQ) with soft combining. Fast scheduling means that the Node B can indicate to each UE the rate the UE is allowed to transmit with. This can be done every TTI, i.e. fast. Thus, the network is able to control the interference in the system very well.

HARQ is a more advanced form of an ARQ retransmission scheme. In conventional ARQ schemes the receiver checks if a packet is received correctly. If it is not received correctly, the erroneous packet is discarded and a retransmission is requested. With HARQ the erroneous packet is not discarded. Instead the packet is kept and soft combined with the retransmission. That implies that even if neither the first transmission nor the retransmission would facilitate a successful decoding when received alone, they may be combined to decode the packet correctly. This means that, compared to conventional ARQ, less transmission power and fewer retransmissions are required on average.

Voice over IP (VoIP) and support for Internet Multimedia Subsystem (IMS) over the new channels like HS-DSCH and E-DCH poses particular challenges. This is because the efficiency of a realization, and the capacity limit, is stressed by a large number of users, all of which are only injecting a low traffic volume with a lot of small packets. Thus, to optimize cell/network capacity, it is therefore very important to minimize the overhead of each user and each packet. This overhead includes both protocol overhead and signalling overhead. The present invention concerns the signalling overhead issue. The reliability of each link could potentially be slightly sacrificed in the quest for reducing overhead.

One of the main differences of the uplink DCH according to Release 99 uplink and E-DCH according to Release 6 is the fact that E-DCH supports HARQ. This means that the "average" transmission power for E-DCH can be kept lower, because stochastic transmission errors due to fading are corrected by the fast HARQ which is located in the Node B. HARQ also uses soft-combining resulting in a high power-efficiency with early-termination gain, etc. These aspects make the E-DCH an attractive and efficient solution.

However, HARQ also implies a cost. Compared to DCH, both the protocol- and the signalling overheads are larger for E-DCH. Thus, in order to make a VoIP-over-E-DCH realization a competitive alternative, it is important to make sure that these costs do not exceed the gains.

This invention relates to an improved HARQ realization and particularly an improved HARQ realization for the E-DCH uplink in WCDMA network and for the downlink channel in HSDPA, HS-DSCH. It should be noted that the invention concerns any system with HARQ.

The state-of-the-art ACK/NACK feedback mechanism is now briefly described. The HARQ is based on multiple interleaved synchronized stop-and-wait ARQ processes with soft combining as illustrated in FIGS. 2-4. The receiver, e.g. the Node B in the case of enhanced uplink, responds to a transmission with an ACK or NACK, so that a successful decoding results in ACK feedback, and unsuccessful decoding results in NACK feedback. To a NACK response, the sender, e.g. the UE is "re-transmitting" on the same HARQ process by providing additional power/redundancy to the decoding process in the receiver. The receiver performs soft combining of the multiple HARQ transmissions. An ACK reception in the UE results in a termination of the HARQ in that process, and that process can then be utilized for transmitting new data. The HARQ feedback is in the case of enhanced uplink carried over an E-DCH HARQ Acknowledgement Indicator Channel (E-HICH). E-DCH supports Macro Diversity, also referred to as soft handover, i.e. there can be multiple cells receiving data and sending feedback to the UE.

HARQ is also used for HS-DS H. HARQ for HS-DSCH is similar to HARQ for E-DCH. It should however be noted that HS-DSCH does not support soft handover and fast power control.

FIG. 3 illustrates the HARQ behaviour for a single process. Here, most transmissions are successful with a single transmission, except block #3, which require two transmissions. The subscript denotes the retransmission sequence number.

FIG. 4 illustrates the HARQ behaviour when the decoding requires several HARQ transmissions. The first block is successfully decoded after three HARQ transmissions, while the second block required only two and the third block needed four transmissions for successful decoding.

A challenge in the operation of HARQ is to achieve sufficient reliability of the HARQ feedback without spending a lot of resources on the ACK/NACK feedback. For small transport blocks in particular, the relative overhead of this signalling may be quite costly.

SUMMARY

The object of the present invention is thus to reduce signalling overhead in a system using HARQ. That is achieved by exploiting if the sender expects an ACK or an NACK, based on a targeted number of ARQ transmissions.

Thus the object of the present invention is achieved by the methods and the transmitter and the receiver according to the independent claims.

The receiver according to the present invention comprising means for transmitting HARQ feedback information only if the decoding result differs from an expected result wherein the expected result is based on a targeted number of required HARQ transmissions, and means for storing the targeted number of required HARQ transmissions, makes it possible to reduce signalling overhead in a system using HARQ.

Further according to an embodiment the receiver comprises further means for omitting transmission of HARQ feedback information if the decoding result is an expected result wherein the expected result is based on the targeted number of required HARQ transmissions.

If the receiver is implemented in a WCDMA system and for enhanced uplink, the HARQ feedback information is transmitted on a HARQ Acknowledgement Indicator Channel. In the case of HSDPA, the HARQ feedback information is transmitted on a high-speed dedicated physical control channel, HS-DPCCH.

When data is transmitted in the uplink direction the receiver comprises preferably means for signalling the targeted number of required HARQ transmissions to the transmitter and when data is transmitted in the downlink direction and the receiver comprises preferably means for receiving the targeted number of required HARQ transmissions from the receiver.

According to an embodiment the receiver comprises means for mapping omitted transmissions of HARQ feedback information to NACK for the first x–1 HARQ transmissions and means for mapping omitted transmissions of HARQ feedback information to ACK on the x:th HARQ transmission wherein the targeted required number of HARQ transmissions are x.

The receiver may also comprise means for looking into a re-transmission sequence number, and means for checking the expected outcome for said re-transmission sequence number in order to check if the decoding result differs from an expected result.

Moreover, the targeted number of required HARQ transmissions may be applicable to a certain priority flow, logical channel and/or Mac-d flow or to a predefined set of Transport Formats.

According to one embodiment the receiver is able to handle situations when the sender mis-interprets a DTX. The receiver comprises hence preferably means for notifying the sender that it has made this erroneous judgement. The means for notifying may comprise means for considering an omitted transmission=a positive HARQ feedback but interpreted in the sender as negative HARQ feedback as a redundant re-transmission in the HARQ process, and means for considering an omitted transmission=negative HARQ feedback but interpreted in the sender as positive HARQ feedback as a premature termination of the HARQ in that process. The receiver may comprise further means for notifying the sender that it has made this erroneous feedback judgement by sending explicit HARQ feedback for that HARQ process during a pre-defined period of time.

The transmitter according to the present invention comprising means for monitoring transmission of HARQ feedback information, means for acting according to an expected result wherein the expected result is based on a targeted number of required Hybrid ARQ transmissions if no HARQ feedback information is detected from the sender, means for storing the targeted number of required Hybrid ARQ transmissions, and means for acting according to the detected HARQ feedback information if HARQ feedback information is detected, makes it possible to reduce signalling overhead in a system using HARQ.

The targeted number of required HARQ transmissions may be applicable to a certain priority flow, logical channel and/or Mac-d flow or to a predefined set of Transport Formats.

The transmitter comprises means for receiving the targeted number of required HARQ from a control node. Further, the targeted number of required HARQ transmissions may be transmitted in association with the first HARQ transmission.

The proportion of feedback information may be particularly high for VoIP-type of services, where a lot of small transport blocks are transmitted, each of which need to be ACK/NACK-ed. Therefore, the present invention is particularly advantageous with such services.

The methods according to the present invention are resource efficient methods for HARQ feedback, where no feedback is transmitted in case the HARQ outcome is along with the expectations. These "expectations" may be defined in a "HARQ operation profile", that is known both at the sender and the receiver.

The invention is particularly suitable for a Serving Cell E-DCH in a WCDMA network, and for the support of VoIP-like traffic, but the solution is generally applicable to any HARQ constellation, i.e. also to HS-DSCH and to Long Term Evolution of the UTRAN.

DETAILED DESCRIPTION OF THE PRESENT INVENTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The basic idea of the present invention is to target the number of HARQ transmissions that is required to be able to decode the transmitted data successfully and to only transmit HARQ feedback information if the decoding result differs from an expected result, wherein the expected result is based on the targeted number of required HARQ transmissions.

Figure 5:
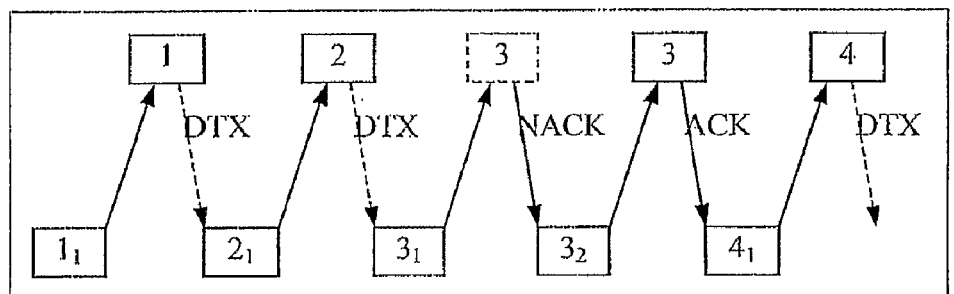
FIGS. 5 and 6 illustrate the proposed mechanism, where HARQ feedback information is sent only when the outcome of the decoding-process differs from the expectation according to the present invention.

FIG. 5 illustrates the mechanism according to the present invention, where HARQ feedback information, i.e. ACK:s and NACKs, is sent only when the outcome of the decoding-process differs from what is expected based on the target number of required HARQ transmissions. Thus the transmission of HARQ feedback information is omitted if the transmissions go as expected. Omission of transmission of HARQ feedback information is also referred to as DTX. Thus, the term DTX is used in this description to indicate that no information is sent which results in that no resources are utilized.

Figure 3:
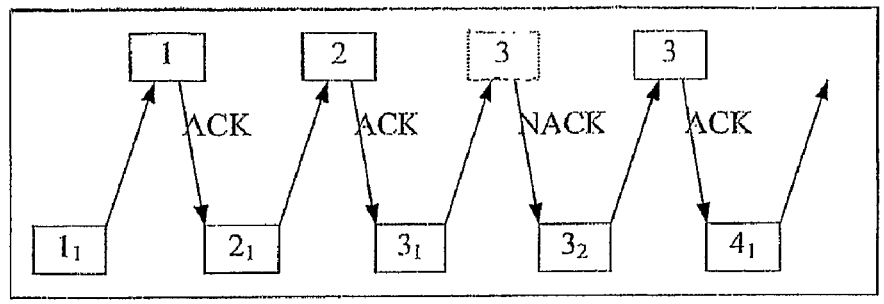
FIG. 3 illustrates the HARQ behaviour for a single process.

Moreover, the present invention is particularly suitable for enhanced uplink, the E-DCH, since the E-DCH is power-controlled, implying that the uplink signal quality is kept rather stable, and the probability of successful decoding per number of HARQ attempts is also rather stable. I.e. a certain signal quality causes a certain number of required HARQ transmissions. That is exemplified by the following two examples:

1) The outer-loop power-control targets a single HARQ transmission with an error probability of 10% on the first transmission. This means that the likelihood for an ACK is 90% on the first HARQ transmission, while only 10% of the first HARQ transmissions will result in a NACK according to the illustrated example of FIG. 3.

Figure 4:
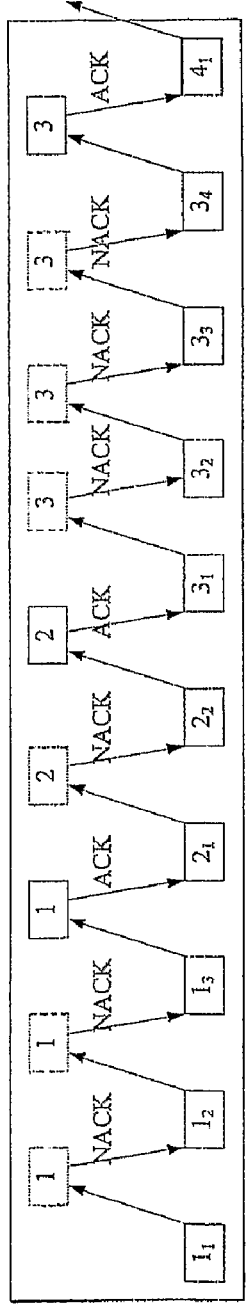
FIG. 4 illustrates the HARQ behaviour when the decoding requires a plurality HARQ transmissions and the target HARQ transmissions are three.

Similarly, if three HARQ transmissions are targeted, there is a very high (close to 100%) probability that NACK:s will be sent as a response to the first two HARQ transmissions, and ACKs are sent only seldom due to successful termination of the HARQ with less than three transmissions. On the third transmission, the likelihood of an ACK is (very) high according to FIG. 4.

One HARQ transmission is targeted in FIG. 5. At the receiver, i.e. at the Node B, successful decoding of the first transmission results in DTX on the feedback channel and decoding error of the first transmission result in an explicit NACK. At the sender, i.e. at the UE, reception of DTX as a response to the first transmission is interpreted as an ACK. A NACK reception result in a regular operation of the HARQ.

Figure 6:
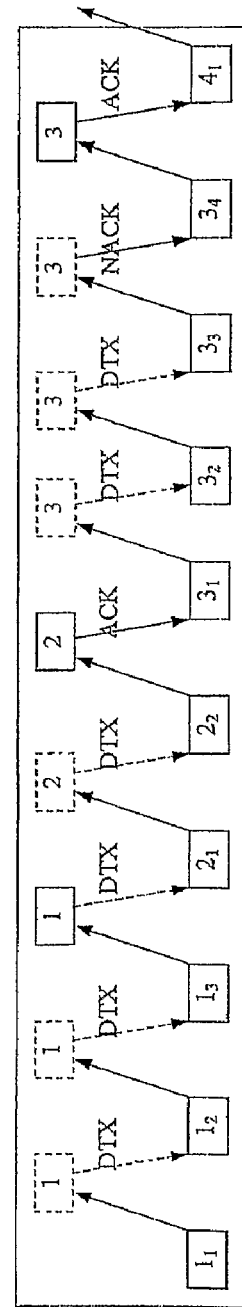

In FIG. 6, the expectation is assumed to be three HARQ transmissions per successful decoding. Unsuccessful decoding after the first and the second HARQ transmissions results in DTX at the receiver while successful decoding of the first and second HARQ transmissions results in ACK. Further, successful decoding after three HARQ transmissions results in DTX while unsuccessful decoding after three HARQ transmissions results in NACK. Reception at the receiver of DTX to the first two transmissions is interpreted as NACK and results in HARQ retransmissions while reception of ACK to any of the first two transmissions results in a termination of the HARQ process. Reception of DTX to the third transmission results in termination of the HARQ (interpreted as ACK) while reception of NACK to the third transmission results in "regular" operation of the HARQ.

It should be noted that DTX has a different meaning whether an ACK or a NACK is expected.

The HARQ feedback is in the case of enhanced uplink carried over an E-DCH HARQ Acknowledgement Indicator Channel (E-HICH) and in the case of HSDPA carried over HS-DPCCH, but the present invention is not limited to those channels.

To facilitate this behaviour, i.e. to make sure that the sender knows how to interpret DTX on the different HARQ transmissions, rules are introduced that are common both to the receiver (e.g. the Node B) and the sender (e.g. the UE) according to an embodiment of the present invention. These rules are further explained below.

Figure 7:
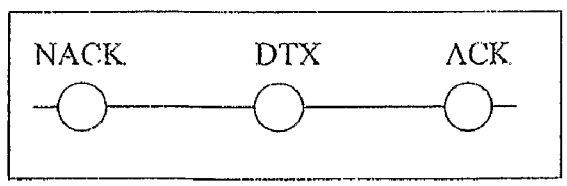
FIG. 7 illustrates the signalling constellation for Serving Cell E-DCH HARQ feedback.

In existing systems HARQ feedback information is sent for every received transport block. The signalling constellation for the E-DCH Serving Cell is shown in FIG. 7. Thus, DTX is according to FIG. 7, used only in cases when no reception is identified, i.e. when there was no reception and when the receiver did not detect it. In the present invention, it is proposed to use DTX whenever the outcome of the reception and decoding is the expected outcome as explained above. Furthermore, as mentioned above, DTX as HARQ feedback information denotes according to an embodiment either ACK or NACK, depending on the expected decoding result that is based on the targeted number of required HARQ transmissions.

The management of the rules for establishing whether the DTX should denote ACK or NACK is explained below. For uplink data transmission, the rules may be signalled from a controlling node (e.g. a RNC) to the data transmitter (i.e. a UE) and the data receiver (i.e. the base station). For downlink data transmission the rules may be signalled from the transmitter (i.e. the base station) to the receiver (i.e. the UE), wherein the transmitter may previously have received the rules from a controlling node. The rules may be static configurations, changed per TTI, or any suitable combination thereof.

The rules are in this application referred to as a HARQ operation profile or a targeted number of required HARQ transmissions. This is performed so that both the sender and receiver has a common understanding of what DTX means for the different transmissions. The rules can be exemplified by Table 1.

If no HARQ feedback is detected at the transmitter as a response to a transmission, the transmitter checks from the HARQ operation profile the meaning of the DTX, and acts accordingly.

At the receiver, if the outcome of a decoding, relative to the present number of HARQ transmissions, is according to the HARQ Operation Profile, then no HARQ feedback is transmitted (=DIX). If the outcome differs from the HARQ Operation Profile, then explicit HARQ feedback information (ACK/NACK) is transmitted.

Table 1 is an example of a "HARQ Operation Profile". This case illustrates the information when the target is three HARQ transmissions for successful decoding. Unsuccessful decoding is therefore the expected outcome of the first two transmissions - and therefore mapped to DTX. The third transmission maps DTX to ACK. Further transmissions are explicitly ACK/NACK:ed. "RSN" stands for Retransmission Sequence Number, which is carried outband in parallel to the data-transmission.

| RSN | DECODED OK | DECODED NOK |
| --- | --- | --- |
| 0 | ACK | DTX |
| 1 | ACK | DTX |
| 2 | DTX | NACK |
| 3 | ACK | NACK |

The present invention might introduce a somewhat higher risk for misinterpreting the HARQ feedback information, as the distance in the constellation in FIG. 7 between ACK and NACK is greater than between DTX and ACK or NACK, respectively. This can of course be compensated by using more power on the "true" ACKs and NACKs, whenever transmitted. Much fewer ACK/NACKs will be sent. Since transmissions are omitted, i.e. DTX are sent, when an outcome of a HARQ transmission is as expected, it is therefore possible to afford more power on those ACK/NACKs that are sent. A "true" ACK/NACK is an ACK/NACK that is transmitted explicitly, i.e. DTX is not used.

Soft handover, i.e. when a UE is communicating simultaneously to more than one base station, also referred to as macro diversity, makes the HARQ behaviour more difficult. In a one-to-one relationship, the receiver can detect if the sender misinterpreted the feedback. However, such HARQ feedback errors can not be un-ambiguously detected in soft handover, because the transmitted block might have been successfully received in another base station. Thus, in the case of soft handover, the network and the UE may resort to the "conventional" ACK/NACK HARQ feedback, because feedback errors cannot be distinguished from macro-diversity reception.

Consequently, means for recovery, i.e. means for detecting mis-interpretation of ACKs and NACKs, may be provided in the receiver. Preferably, the recovery means may be used when a UE is not in soft handover, although it is possible to use the recovery means also during soft handover. A misinterpretation will be detected in the receiver by monitoring the sender behaviour as explained below.

Thus, a DTX=ACK but interpreted in the sender as NACK will be seen as a redundant re-transmission in the HARQ process, and a DTX=NACK but interpreted in the sender as ACK will be seen as a premature termination of the HARQ in that process.

The receiver may notify the sender that it has made this erroneous feedback judgement by sending explicit HARQ feedback for that HARQ process during a pre-defined period of time. This recovery mechanism also ensures that not too many data blocks are lost in a row which would otherwise happen if DX=NACK is decoded as ACK.

Further, as stated above the HARQ operation profile may be changed, configured and re-configured during operation.

According to an embodiment of the present invention, targeting X transmissions means that omission of HARQ feedback information means NACK for the first X−1 transmissions, while omission of HARQ feedback information on the Xth transmission means ACK. Means for storing and using this information in the sender and receiver are required.

An example how the receiver and sender may operate according to the HARQ operation profile is illustrated by the following example.:

The receiver comprises means for looking into the retransmission sequence number (RSN) and means for checking the expected outcome for this RSN. The receiver comprises further means for omitting transmission of ACK/NACK feedbacks if the actual outcome is the expected and means for transmitting ACK/NACK feedbacks if the outcome is different from the expected.

Moreover, a transmitter according to the present invention comprises means for listening to the feedback information, and if no feedback is received from the receiver, it acts according to the expected outcome of the RSN to be acknowledged. If explicit feedback is detected, then it comprises means for acting according to the detected feedback.

According to a yet further embodiment, one HARQ operation profile is applicable to a certain priority data flow, a certain logical channel or a certain Mac-d flow. That implies that it is possible to limit the use of the present invention to a subset of all transmissions on e.g. the E-DCH or HS-DSCH. This subset of transmissions may be limited by a certain HARQ process, data flow priority, logical channel and/or MAC-d flow. A MAC-d flow is transported by a transport bearer between the RNC and the base station and a plurality of logical channels may be multiplexed onto a MAC-d flow. HARQ for E-DCH may have different power offsets for different MAC-d flows which affects the targeted number of required HARQ transmissions. That implies that it is possible to have different HARQ re-transmission targets for one UE. I.e. different flows multiplexed over the same E-DCH transport channel may have different HARQ re-transmission targets. According to a first alternative, the targeted number of HARQ transmissions is sent as outband information in association with the first transmission, since the information of which logical channel a certain flow belongs to is not available before decoding at the receiver. According to a second alternative, one HARQ operation profile is associated with a subset of available transport format. A transport format can be conceptualized as a certain transport block size facilitating the transmission of a given amount of data in a TTI. This transport block can also be associated with certain attributes characterizing the transmission of the block, such as coding, modulation and power attributes defining how and with which reliability the data is transmitted. In this second alternative, no explicit outband signalling of the HARQ re-transmission target according to the first alternative would be needed. The solution according to the second alternative is suitable e.g. for VoIP applications.

It should be noted that the present invention is not limited to enhanced uplink and E-DCH, i.e when the Node B is the receiver and the UE is the transmitter. The present invention is also applicable to HSDPA, i.e. on the channel HS-DSCH wherein the UE is the receiver and wherein the Node B is the transmitter and on other channels using HARQ both uplink and downlink.

The present invention relates to methods in a receiver and transmitter in a communication system using HARQ. The receiver is adapted to transmit HARQ feedback information on a first channel in response to a decoding result of data received on a second channel at the receiver transmitted from a transmitter. The method in the receiver comprises the step of transmitting HARQ feedback information only if the decoding result differs from an expected result wherein the expected result is based on a targeted number of required HARQ transmissions, and the targeted number of required HARQ transmissions is known at the receiver and at the transmitter. The transmitter is adapted to receive feedback information on a first channel from the receiver in response to a decoding result of data transmitted on a second channel from the transmitter to the receiver and the method in the transmitter comprises the steps of monitoring transmission of HARQ feedback information, and if no HARQ feedback information is detected from the sender, acting according to an expected result wherein the expected result is based on a targeted number of required Hybrid ARQ transmissions, and the targeted number of required Hybrid ARQ transmissions is known at the receiver and at the transmitter, and if HARQ feedback information is detected, acting according to the detected HARQ feedback information.

Thus, the receiver according to the present invention comprises means for transmitting HARQ feedback information only if the decoding result differs from an expected result wherein the expected result is based on a targeted number of required HARQ transmissions, and means for storing the targeted number of required HARQ transmissions.

Further, the transmitter according to the present invention comprises means for monitoring transmission of HARQ feedback information, means for acting according to an expected result wherein the expected result is based on a targeted number of required Hybrid ARQ transmissions if no HARQ feedback information is detected from the sender, means for storing the targeted number of required Hybrid ARQ transmissions, and means for acting according to the detected HARQ feedback information if HARQ feedback information is detected.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for a receiver of communication system using Hybrid ARQ, HARQ, wherein the receiver is adapted to transmit HARQ feedback information on a first channel in response to a decoding result of data received on a second channel at the receiver transmitted from a transmitter, characterised in that the method comprises:
   transmitting HARQ feedback information only if the decoding result differs from an expected result wherein the expected result is based on a targeted number of required HARQ transmissions, and the targeted number of required HARQ transmissions is known at the receiver and at the transmitter.

2. The method according to claim 1, characterised in that the method further comprises:
   omitting transmission of HARQ feedback information if the decoding result is an expected result wherein the expected result is based on the targeted number of required HARQ transmissions.

3. The method according to the previous claim 2, characterised in that the communication system is a WCDMA system.

4. The method according to the previous claim 3, characterised in that the first channel is a HARQ Acknowledgement Indicator Channel, E-HICH and that the second channel is an E-DCH.

5. The method according to claim 3, characterized in that the first channel is a high-speed dedicated physical control channel, HS-DPCCH and that the second channel is a HS-DSCH.

6. The method according to claim 2, characterised in that the method further comprises:
   mapping omitted transmissions of HARQ feedback information to NACK for the first x−1 HARQ transmissions and
   mapping omitted transmissions of HARQ feedback information to ACK on the x:th HARQ transmission wherein the targeted required number of HARQ transmissions are x.

7. The method according to claim 2, characterised in that the method further comprises:
   notifying a sender that an erroneous judgement has been made.

8. The method according to the previous claim 7, characterised in that the notifying comprises:
   considering an omitted transmission as equal to a positive HARQ feedback but interpreted in the sender as negative HARQ feedback as a redundant re-transmission in the HARQ process, and
   considering an omitted transmission as equal to negative HARQ feedback but interpreted in the sender as positive HARQ feedback as a premature termination of the HARQ in that process.

9. The method according to the previous claim 8, characterised in that the method further comprises:
   notifying the sender that the erroneous judgement has been made by sending explicit HARQ feedback for that HARQ process during a pre-defined period of time.

10. The method according to claim 1, characterized in that the method further comprises:
    signalling the targeted number of required HARQ transmissions to the transmitter.

11. The method according to claim 1, characterized in that the method further comprises:
    receiving the targeted number of required HARQ transmissions from the transmitter.

12. The method according to claim 1, characterized in that the method further comprises:
    looking into a re-transmission sequence number,
    checking the expected outcome for said re-transmission sequence number in order to check if the decoding result differs from an expected result.

13. The method according to claim 1, characterised in that the targeted number of required HARQ transmissions is applicable to a certain priority flow, logical channel and/or Mac-d flow.

14. The method according to claim 1, characterised in that the targeted number of required HARQ transmissions is applicable to a predefined set of Transport Formats.

15. A method for a transmitter of communication system using Hybrid ARQ, wherein the transmitter is adapted to receive feedback information on a first channel from the receiver in response to a decoding result of data transmitted on a second channel from the transmitter to the receiver, characterised in that the method comprises:
    monitoring transmission of HARQ feedback information, and if no HARQ feedback information is detected from the sender,
    acting according to an expected result wherein the expected result is based on a targeted number of required Hybrid ARQ transmissions, and the targeted number of required Hybrid ARQ transmissions is known at the receiver and at the transmitter, and if HARQ feedback information is detected,
    acting according to the detected HARQ feedback information.

16. The method according to the previous claim 15, characterised in that the targeted number of required HARQ transmissions is applicable to a certain priority flow, logical channel and/or Mac-d flow.

17. The method according to claim 15, characterised in that the method further comprises:
   receiving the targeted number of required HARQ from a control node.

18. The method according to claim 15, characterised in that the method further comprises:
   transmitting the targeted number of required HARQ transmissions in association with the first HARQ transmission.

19. A receiver for a communication system using Hybrid ARQ, HARQ, wherein the receiver is adapted to transmit HARQ feedback information on a first channel in response to a decoding result of data received on a second channel at the receiver transmitted from a transmitter, characterised in that the receiver comprises:
   means for transmitting HARQ feedback information only if the decoding result differs from an expected result wherein the expected result is based on a targeted number of required HARQ transmissions;
   means for storing the targeted number of required HARQ transmissions; and
   means for omitting transmission of HARQ feedback information if the decoding result is an expected result wherein the expected result is based on the targeted number of required HARQ transmissions.

20. The receiver according to claim 19, characterised in that the receiver further comprises means for mapping omitted transmissions of HARQ feedback information to NACR for the first x−1 HARQ transmissions and
   means for mapping omitted transmissions of HARQ feedback information to ACK on the x:th HARQ transmission wherein the targeted required number of HARQ transmissions are x.

21. The receiver according to claim 19, characterised in that the receiver further comprises means for looking into a re-transmission sequence number, and means for checking an expected outcome for said re-transmission sequence number in order to check if the decoding result differs from an expected result.

22. The receiver according to claim 19, characterised in that the receiver further comprises means for notifying a sender that it has made this an erroneous judgement has been made.

23. The receiver according to the previous claim 22, characterised in that the means for notifying comprises means for considering an omitted transmission as equal to a positive HARQ feedback but interpreted in the sender as negative HARQ feedback as a redundant retransmission in the HARQ process, and means for considering an omitted transmission as equal to negative HARQ feedback but interpreted in the sender as positive HARQ feedback as a premature termination of the HARQ in that process.

24. The receiver according to the previous claim 23, characterised in that the receiver further comprises means for notifying the sender that an erroneous feedback judgement has been made by sending explicit HARQ feedback for that HARQ process during a pre-defined period of time.

25. A receiver for a communication system using Hybrid ARO, HARQ, wherein the receiver is adapted to transmit HARQ feedback information on a first channel in response to a decoding result of data received on a second channel at the receiver transmitted from a transmitter, characterised in that the receiver comprises:
   means for transmitting HARQ feedback information only if the decoding result differs from an expected result wherein the expected result is based on a targeted number of required HARQ transmissions; and
   means for storing the targeted number of required HARQ transmissions,
   wherein the communication system is a WCDMA system, and
   wherein the first channel is a HARQ Acknowledgement Indicator Channel, E-HICH, and that the second channel is an E-DCH.

26. A receiver for a communication system using Hybrid ARQ, HARQ, wherein the receiver is adapted to transmit HARQ feedback information on a first channel in response to a decoding result of data received on a second channel at the receiver transmitted from a transmitter, characterised in that the receiver comprises:
   means for transmitting HARQ feedback information only if the decoding result differs from an expected result wherein the expected result is based on a targeted number of required HARQ transmissions; and
   means for storing the targeted number of required HARQ transmissions,
   wherein the communication system is a WCDMA system, and
   wherein the first channel is a high-speed dedicated physical control channel, HS-DPCCH, and that the second channel is a HS-DSCH.

27. A receiver for a communication system using Hybrid ARQ, HARQ, wherein the receiver is adapted to transmit HARQ feedback information on a first channel in response to a decoding result of data received on a second channel at the receiver transmitted from a transmitter, characterised in that the receiver comprises:
   means for transmitting HARQ feedback information only if the decoding result differs from an expected result wherein the expected result is based on a targeted number of required HARQ transmissions;
   means for storing the targeted number of required HARQ transmissions; and
   means for signalling the targeted number of required HARQ transmissions to the transmitter.

28. A receiver for a communication system using Hybrid ARQ, HARQ, wherein the receiver is adapted to transmit HARQ feedback information on a first channel in response to a decoding result of data received on a second channel at the receiver transmitted from a transmitter, characterised in that the receiver comprises:
   means for transmitting HARQ feedback information only if the decoding result differs from an expected result wherein the expected result is based on a targeted number of required HARQ transmissions;
   means for storing the targeted number of required HARQ transmissions; and
   wherein the targeted number of required HARQ transmissions is applicable to a certain priority flow, logical channel and/or Mac-d flow.

29. A receiver for a communication system using Hybrid ARQ, HARQ, wherein the receiver is adapted to transmit HARQ feedback information on a first channel in response to a decoding result of data received on a second channel at the receiver transmitted from a transmitter, characterised in that the receiver comprises:
   means for transmitting HARQ feedback information only if the decoding result differs from an expected result wherein the expected result is based on a targeted number of required HARQ transmissions;

means for storing the targeted number of required HARQ transmissions; and wherein the targeted number of required HARQ transmissions is applicable to a predefined set of Transport Formats.

30. A transmitter for communication system using Hybrid ARQ, wherein the transmitter is adapted to receive feedback information on a first channel from the receiver in response to a decoding result of data transmitted on a second channel from the transmitter to the receiver, characterised in that the transmitter comprises:

means for monitoring transmission of HARQ feedback information;

means for acting according to an expected result wherein the expected result is based on a targeted number of required Hybrid ARQ transmissions if no HARQ feedback information is detected from the sender;

means for storing the targeted number of required Hybrid ARQ transmissions;

means for acting according to the detected HARQ feedback information if HARQ feedback information is detected, wherein the targeted number of required HARQ transmissions is applicable to a certain priority flow, logical channel and/or Mac-d flow; and means for receiving the targeted number of required HARQ from a central node.

31. The transmitter according to the previous claim 30, characterized in that the transmitter further comprises means for transmitting the targeted number of required HARQ transmissions in association with a first HARQ transmission.

* * * * *

UNITED STATES PATENT AND TRADEMARK OFFICE
CERTIFICATE OF CORRECTION

| | |
|---|---|
| PATENT NO. | : 8,151,154 B2 |
| APPLICATION NO. | : 12/097490 |
| DATED | : April 3, 2012 |
| INVENTOR(S) | : Sågfors et al. |

It is certified that error appears in the above-identified patent and that said Letters Patent is hereby corrected as shown below:

On the Face Page, in Field (75), under "Inventors", in Column 1, Line 1, delete "Sagfors, Kyrkslatt" and insert -- Sågfors, Kyrkslätt --, therefor.

On the Face Page, in Field (73), under "Assignee", in Column 1, Line 2, delete "(publ)" and insert -- (publ), Stockholm --, therefor.

Figure 1:
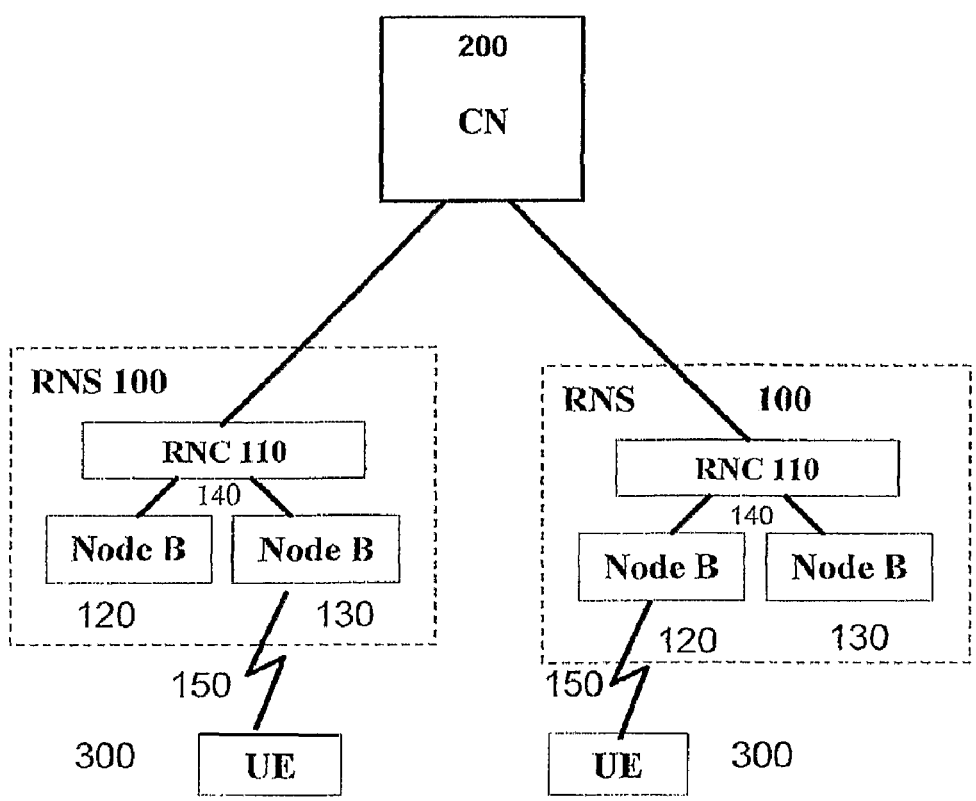
FIG. 1 illustrates a mobile telecommunication network wherein the present invention may be implemented.
Figure 2:
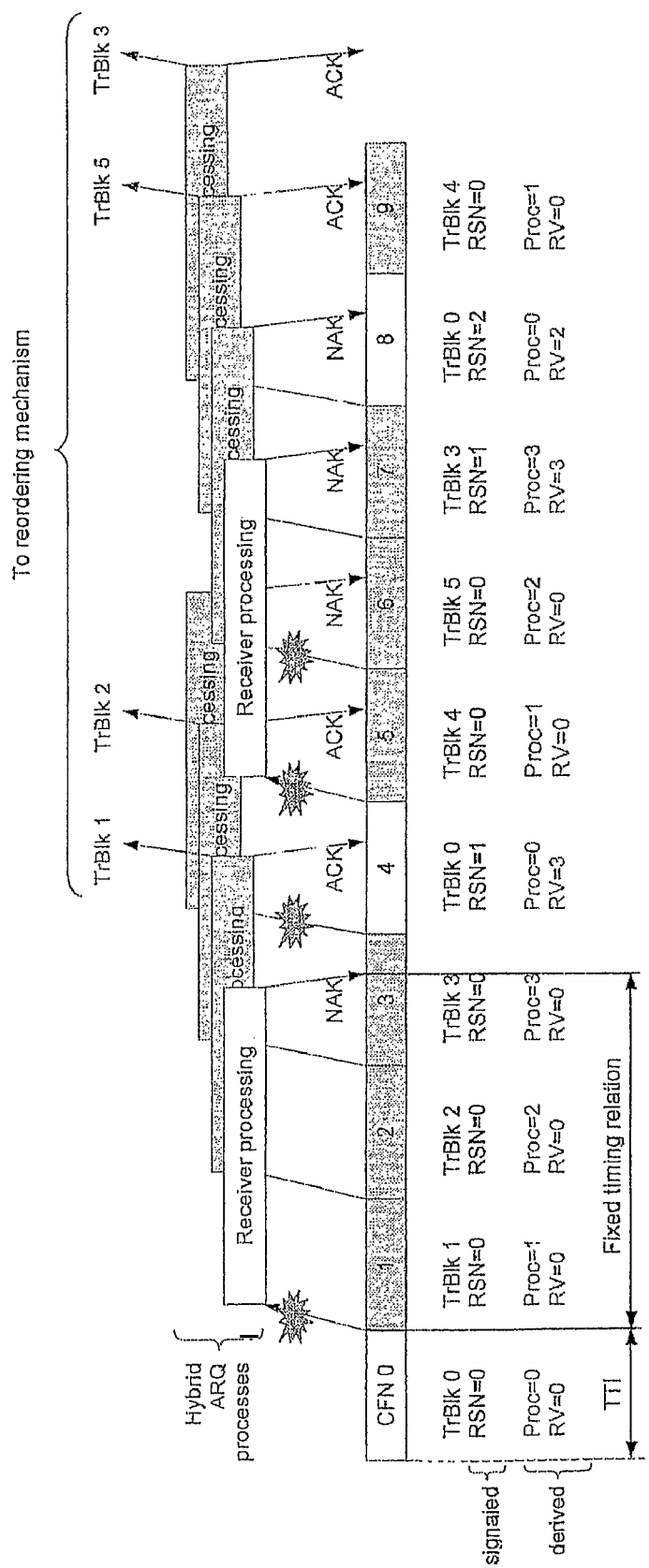
FIG. 2 illustrates a protocol operation with multiple hybrid ARQ processes. (four in this example, corresponding to 10 ms TTI).

In Fig. 2, Sheet 2 of 4, delete "signaied" and insert -- signaled --, therefor.

In Column 2, Line 60, delete "HS-DS H." and insert -- HS-DSCH. --, therefor.

In Column 6, Line 65, delete "(=DIX)." and insert -- (=DTX). --, therefor.

In Column 7, Line 59, delete "DX=NACK" and insert -- DTX-NACK --, therefor.

In Column 8, Line 3, delete "example.:" and insert -- example: --, therefor.

In Column 11, Line 32, in Claim 20, delete "NACR" and insert -- NACK --, therefor.

In Column 11, Line 46, in Claim 22, delete "it has made this an" and insert -- an --, therefor.

In Column 11, Line 63, in Claim 25, delete "ARO," and insert -- ARQ, --, therefor.

Signed and Sealed this
Third Day of July, 2012

David J. Kappos
*Director of the United States Patent and Trademark Office*